United States Patent [19]

Heath et al.

[11] Patent Number: 4,565,082

[45] Date of Patent: Jan. 21, 1986

[54] SPRAY APPARATUS FOR METAL FORMING MACHINES

[75] Inventors: Allan B. Heath; Richard C. Gossman, both of Port Huron, Mich.

[73] Assignee: Acheson Industries, Inc., Port Huron, Mich.

[21] Appl. No.: 533,760

[22] Filed: Sep. 19, 1983

Related U.S. Application Data

[62] Division of Ser. No. 404,480, Aug. 6, 1982, Pat. No. 4,452,578.

[51] Int. Cl.⁴ .................. B21J 3/00; B21D 37/18; B05B 1/34; C03B 4/02
[52] U.S. Cl. .................................. 72/45; 65/24; 65/169; 65/170; 239/463; 239/561; 425/78; 425/DIG. 115
[58] Field of Search .................. 65/24, 25.1, 169, 170; 72/43, 44, 45; 164/149, 267; 239/461, 463, 468, 469, 561; 425/78, 90, 95, 98, 107, 352, 354, 355, DIG. 115

[56] References Cited

U.S. PATENT DOCUMENTS

| | | | |
|---|---|---|---|
| 2,317,687 | 4/1943 | Larcher | 425/107 |
| 2,362,058 | 1/1944 | Emerson | 425/95 |
| 3,132,379 | 5/1964 | Crane | 425/DIG. 115 |
| 3,141,752 | 7/1964 | Keller | 65/25.1 |
| 3,186,818 | 6/1965 | Havens et al. | 65/169 |
| 3,309,750 | 3/1967 | Gally | 425/DIG. 115 |
| 3,443,280 | 5/1969 | Hugger | 425/36 |
| 3,480,422 | 11/1969 | Lichok et al. | 65/169 |
| 3,508,893 | 4/1970 | Duggan | 65/24 |
| 3,536,468 | 10/1970 | Colchagoff | 65/208 |
| 3,580,711 | 5/1971 | Hamilton | 65/169 |
| 3,623,856 | 11/1971 | Keller | 65/169 |
| 3,645,319 | 2/1972 | Pondelicek et al. | 425/107 |
| 3,801,299 | 4/1974 | Renkl | 65/169 |
| 3,995,979 | 12/1976 | Fedrigo | 425/DIG. 115 |
| 3,999,922 | 12/1976 | Shimada | 425/354 |
| 4,029,449 | 6/1977 | Lonaberger | 425/48 |
| 4,223,544 | 9/1980 | Main | 72/45 |
| 4,262,512 | 4/1981 | Maeder | 72/45 |
| 4,300,375 | 11/1981 | Maeder et al. | 72/45 |
| 4,333,756 | 6/1982 | Seeman | 65/25.1 |
| 4,364,719 | 12/1982 | Levine | 425/107 |
| 4,426,041 | 1/1984 | Nieuwkamp et al. | 239/468 |

FOREIGN PATENT DOCUMENTS 1349121 4/1971 United Kingdom .

Primary Examiner—E. Michael Combs
Attorney, Agent, or Firm—Harness, Dickey & Pierce

[57] ABSTRACT

A multipiece spray assembly is disclosed which provides an annular axially and radially inwardly inclined nozzle passage operative to rapidly and efficiently apply a substantially complete and uniform coating to the inner surfaces of a forming cavity. Additional nozzle means may also be provided to simultaneously coat an overlying forming tool.

17 Claims, 4 Drawing Figures

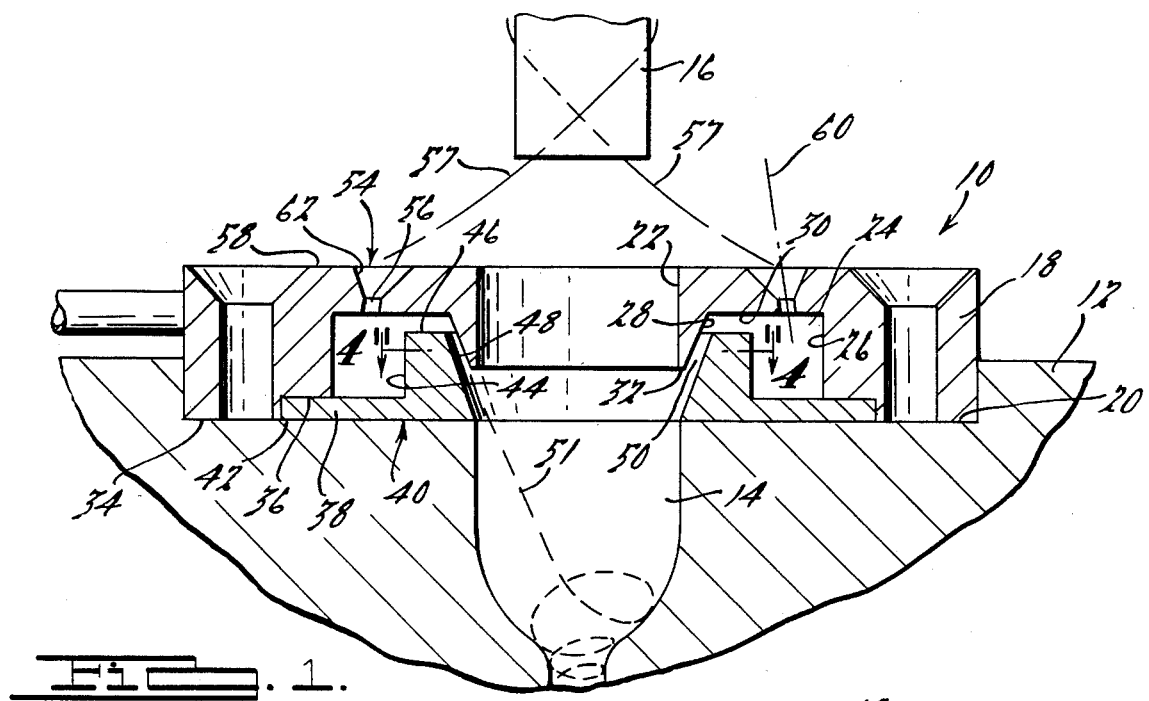
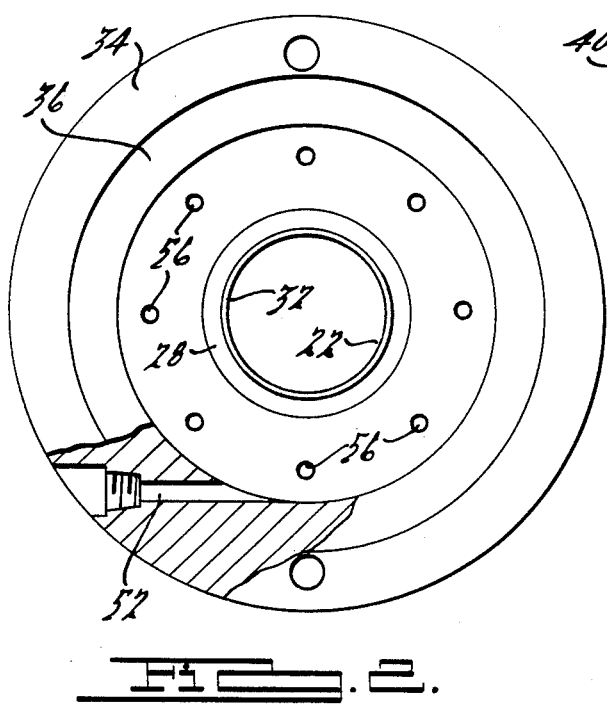
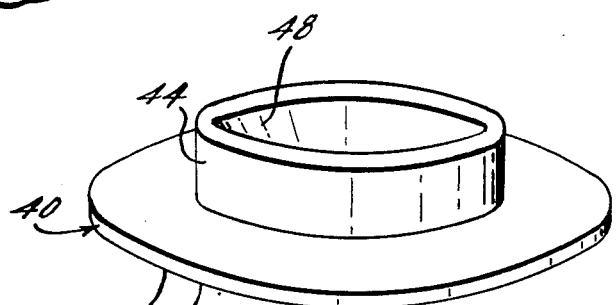
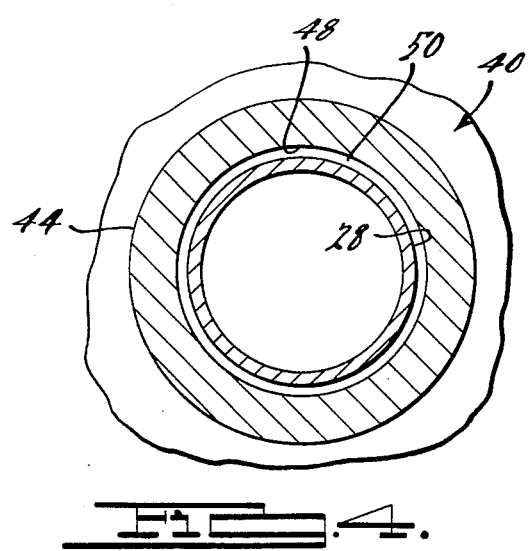

SPRAY APPARATUS FOR METAL FORMING MACHINES

This application is a divisional of application Ser. No. 404,480, filed Aug. 6, 1982 U.S. Pat. No. 4,452,578.

BACKGROUND AND SUMMARY OF THE INVENTION

This invention broadly relates to a novel lubricant spraying apparatus for use in forming machines and in particular in metal forming and glassware forming machines. More particularly, the invention relates to a special spray ring apparatus used in such machines which includes an annular or a plurality of special nozzles which enable the fluid lubricant material to be sprayed into the cavity of the forming machine as well as other forming means associated therewith such that the interior and exterior surfaces thereof are uniformly and properly coated with the lubricant.

In the past there have been numerous problems in metal forming and glassware forming machines caused by the fact that the forming cavities utilized therein were not properly coated with the lubricant material which is conventionally used therein to provide lubricating and release agent properties to the cavity during the forming operations therein and for release of the part after the forming operation has been completed. Such problems are highly significant in that improper lubricant coating can lead to highly serious distortions, deformations, improper configurations, etc. in the part being formed in the cavity.

The state of the art is indicated by the following U.S. patents: Hamilton U.S. Pat. No. 3,580,711; Duggan U.S. Pat. No. 3,508,893; Colchagoff U.S. Pat. No. 3,536,468; Keller U.S. Pat. No. 3,623,856; Keller U.S. Pat. No. 3,141,752; Renkl U.S. Pat. No. 3,801,299; Lichok et al U.S. Pat. No. 3,480,422; Havens et al U.S. Pat. No. 3,186,818; and British Pat. No. 1,349,121.

The present invention represents an improvement over the spraying apparatus disclosed and claimed in U.S. Pat. No. 4,364,719, entitled "Spray Apparatus For Metal Forming And Glassware Forming Machines" and copending application Ser. No. 404,480, filed Aug. 6, 1982 entitled "Spray Apparatus For Metal Forming And Glassware Forming Machines" both of which are assigned to the same assignee as the present invention and the disclosures of which are hereby incorporated by reference.

Accordingly, it is a primary object of this invention to provide a new lubricant spraying apparatus for use with forming machines and particularly metal forming and glassware forming machines.

Another object of the invention is to provide a new spray ring apparatus for use with either metal forming or glassware forming machines wherein said spray ring apparatus include special nozzle means which are operative to spray a fluid lubricant material into the forming cavities of said machines in a unique manner such that the lubricant material is generally uniformly coated on the desired interior surfaces of the forming machine.

A further object of the present invention is to provide a new spray ring apparatus which also provides a plurality of nozzle means operative to apply a fluid lubricant material to the surfaces of an associated overlying forming tool of metal or glassware forming machines in a unique manner substantially simultaneously with the coating of the die cavity.

Briefly stated, the present invention concerns a lubricant spraying apparatus for metal forming and glassware forming machines of the type having a forming cavity into which the material to be formed is placed, and nozzle means arranged to discharge fluid lubricant into the cavity prior to each forming operation such that the walls of the cavity and parts associated therewith in the forming operation are properly coated with the lubricant, said apparatus being comprised of a spray ring means which is positioned generally around the opening of the cavity, said nozzle means being positioned on the spray ring and being operative to discharge fluid lubricant into the cavity in a helical tangential flow pattern, and conduit means for connecting the nozzle means and spray ring means to a source of fluid lubricant whereby a predetermined amount of lubricant can be supplied to the cavity at desired intervals of operation. Additional nozzles may be provided for simultaneously applying a fluid lubricant coating to associated male forming apparatus utilizing a helical tangential flow pattern.

Additional advantages and features of the present invention will become apparent from the subsequent description and the appended claims taken in conjunction with the accompanying drawings.

BRIEF DESCRIPTION OF THE DRAWINGS

FIG. 1 is a section view of a spray assembly in accordance with the present invention shown in operative relationship to forming apparatus;

FIG. 2 is a bottom view of the housing forming a part of the spray assembly of FIG. 1 with the insert removed therefrom and portions broken away;

FIG. 3 is a perspective view of the insert for use in the spray assembly of FIG. 1; and FIG. 4 is a fragmentary section view of the spray assembly of FIG. 1, the section being taken along line 4—4 thereof.

DESCRIPTION OF THE PREFERRED EMBODIMENT

Referring now to the drawings and in particular to FIG. 1, there is illustrated a spray ring assembly 10 in accordance with the present invention shown in operative relationship on a forming machine including a die 12 having a cavity 14 formed therein and an overlying forming tool 16.

Forming machines in which dies 12 and tools 16 such as those shown in FIG. 1 are utilized typically operate at very high speeds, for example, with approximately one part per second being formed in the machine. It is extremely important in the operation of such machines that the die cavity 14 and tool 16 be properly coated with lubricant mixture such that the parts being formed at the high operating speeds do not have distortions, bends, disconfigurations and the like, in the part being formed, as a result of the cavity 14 and/or tool 16 being improperly or nonuniformly coated with lubricant and to avoid excessive wear of the forming tools. Accordingly, spray ring assembly 10 is designed to apply a rapid uniform and substantially complete coating of an atomized or fluidized lubricant air mixture to the working surfaces thereof.

Spray ring 10 comprises a generally cylindrically shaped housing 18 which may be adapted to be fitted within a recess 20 provided in the upper surface of die 12 and includes a central opening 22 extending therethrough. A relatively large annular manifold cavity or chamber 24 is provided radially outwardly spaced from and surrounding central opening 22, cavity 24 being defined by a radially outer annular axially extending wall 26, a radially inner annular frusto conical wall 28 and a generally radially extending annular interconnecting wall 30. The radially inner wall 28 terminates at a generally radially extending annular flat 32 spaced slightly radially outwardly with respect to the die cavity 14 and axially from the lower surface 34 of housing 18. Chamber 24 also includes an annular recess 36 provided in lower surface 34 of housing 18 extending generally radially outwardly from the radially outer wall 26 of annular cavity 24 which recess 36 is designed to receive a generally radially extending annular flange portion 38 of an insert member 40 so as to place the lower surface 42 thereof in substantially coplanar relationship with surface 34.

Insert member 40 includes a generally cylindrically shaped upstanding portion defined by a generally axially extending radially outer wall 44, a generally radially extending outer wall 46 and a generally frusto conical radially inner wall 48, radially inner wall 48 being positioned in coaxial spaced substantially parallel relationship to frusto conical wall 28.

Insert member 40 may be assembled to housing 18 in any desired manner such as by press or slip fit or alternatively suitable fasteners may be employed. Thus as assembled, insert member 40 and housing 18 will define a substantially closed manifold chamber 24 and an annular generally axially and radially inwardly directed annular nozzle portion 50 between walls 28 and 48 operative to supply a spray pattern to the interior of the die cavity 14. Housing 18 also has provided therein an inlet 52 extending inwardly and positioned to open tangentially into the manifold chamber 24 whereby a circular flow will be imparted to the lubricant as it enters chamber 24. This circular flow will continue as the lubricant exits through the annular nozzle 50 so as to provide a helical flowpath (generally similar to that shown by dotted line 51) to uniformly and completely coat the interior surfaces of the die cavity 14.

Additionally, a plurality of nozzle openings 54 may be provided in the upper surface to apply a coating to an associated overlying forming tool 16. Nozzles 54 comprise a plurality of relatively small diameter bores 56 extending from outwardly facing surface 58 of housing 18 into the manifold chamber 24, the bores 56 being substantially equally circumferentially spaced. Preferably, the axis 60 of the bores 56 will be inclined radially inwardly slightly and also in a generally tangential direction. The effect of this compound angling of the bores 56 will be to impart a spiralling helical flowpath (such as indicated by dotted lines 57) of decreasing radius which will operate to insure a uniform complete coating of the overlying forming tool 16. In order to facilitate flaring or spreading of the spray pattern as it exits from bores 56, the outer portion of each of the bores 56 is provided with a conical counter bore portion 62 also having an axis suitably radially inwardly and circumferentially angled. The actual angle of inclination in both the radial and tangential directions for both bore 56 and counterbore 62 will be selected for the particular application based upon the distance to the overlying forming tool 16 from the outer surface 58 of the spray ring 10 whereby the apex of the resulting generally conically spaced flowpath will be suitably positioned an appropriate distance outwardly from and generally coaxially with center opening 22. It is also to be noted that in order to insure both the nozzle 50 and nozzle openings 54 operate together, it may generally be desirable to size the nozzles 50 and 54 so as to provide a total cross sectional area equal to about 95–97% of the cross sectional area of inlet 52 so as to generate a slight back pressure within chamber 24 thereby assuring full fluid flow through each of these nozzles and hence substantially complete uniform coating of the working surfaces of the forming tool.

Thus, as is now apparent, the spray ring of the present invention is well suited for rapidly and efficiently applying a complete and relatively uniform coating to both the cavity and overlying forming tool simultaneously. The embodiment herein disclosed may be easily and relatively inexpensively fabricated and is well suited for use with substantially any and all forms of die cavities with the helical flowpath generated thereby being effective to provide the desired coating over even the most difficult to coat surfaces. Preferably, the spray ring of the present invention will be provided with a supply of atomized lubricant mixture from remotely located valve/nozzle means such as of the type disclosed in assignee's copending application Ser. No. 161,060, filed June 19, 1980.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

We claim:

1. A lubricant spraying apparatus for applying a fluid lubricant to the working surfaces of a forming machine, said working surfaces comprising in part the surfaces of a die cavity and in part the surfaces of an overlying forming tool, said spraying apparatus comprising:
   a main housing defining a cavity opening on one side of said housing;
   an insert member receivable within said cavity, said insert member having first surface cooperating with said housing cavity to define a manifold chamber and second surfaces, also cooperating with said housing cavity to define nozzle means opening outwardly from said manifold chamber;
   inlet passage means in said housing for conducting a supply of lubricant mixture to said manifold chamber, said inlet opening generally tangentially into said chamber so as to impart a circular flow to said lubricant within said manifold chamber; and
   a plurality of circumferentially spaced second nozzles in said housing and opening outwardly from said manifold chamber in a direction away from said cavity, said second nozzles being operative to apply said lubricant to said surface of said overlying forming tool;
   said housing being adapted to be positioned with respect to said die cavity so that said nozzle means will direct the circularly flowing lubricant in a helical flowpath into said cavity.

2. A spraying apparatus as set forth in claim 1 wherein said second nozzles comprise a plurality of bores, each of said bores having an axis inclined generally radially inwardly and circumferentially whereby the flow of lubricant emanating therefrom will follow a generally helical conical spiral.

3. A spraying apparatus as set forth in claim 1 wherein said housing has a central bore overlying said cavity and said nozzle means open into said central bore.

4. A spraying apparatus as set forth in claim 3 wherein said nozzle means extend around the periphery of said bore.

5. A spraying apparatus as set forth in claim 4 wherein said nozzle means is continuous around the entire periphery of said bore.

6. A lubricant spraying apparatus for applying a fluid lubricant to the working surfaces of a forming machine, said working surfaces comprising in part the surfaces of a die cavity and in part the surfaces of an overlying forming tool, said spraying apparatus comprising:

a main housing having an annular manifold cavity formed therein adapted to be positioned in overlying relationship to said cavity;

an insert member positioned within said manifold cavity said insert member having first surface cooperating with said housing cavity to define a substantially closed manifold chamber, and second surfaces also cooperating with said housing cavity to define nozzle means opening outwardly from said manifold chamber toward said cavity when said housing is positioned in overlying relationship thereto;

a plurality of circumferentially spaced second nozzles in said housing and opening outwardly from said manifold chamber in a direction away from said cavity, said second nozzles being operative to apply said lubricant to said surface of said overlying forming tool; and an inlet passage means for conducting a supply of lubricant mixture to said manifold chamber, said inlet opening substantially tangentially into said chamber so as to impart a generally circular flow to said lubricant within said manifold chamber such that said lubricant emanating from said nozzle means will follow a helical flowpath into said cavity.

7. A spraying apparatus as set forth in claim 6 wherein said insert member includes a generally frusto conically shaped surface positioned in spaced relationship to a generally frusto conically shaped surface of said housing, said conically shaped surfaces defining said nozzle means.

8. A spraying apparatus as set forth in claim 7 wherein said insert includes a flange portion extending generally radially outwardly from said conically shaped surface, and said housing includes a stepped recess forming a part of said cavity, said flange portion being seated within said recess.

9. A spraying apparatus as set forth in claim 7 wherein said housing includes a central opening overlying said cavity and said nozzle means opens into said opening.

10. A spraying apparatus as set forth in claim 9 wherein said conically shaped surfaces are inclined radially inwardly in the direction of said cavity.

11. A lubricant spraying apparatus for applying a fluid lubricant to the working surfaces of a forming machine, said working surfaces comprising in part the surfaces of a die cavity and in part the surfaces of an overlying forming tool, said spraying apparatus comprising:

a main housing having a central opening overlying said cavity;

an annular manifold cavity formed in said housing;

an insert member positioned within said manifold cavity, said insert member having first surfaces cooperating with said housing cavity to define a substantially closed manifold chamber, and second surfaces also cooperating with said housing cavity to define an annular nozzle opening into said central opening from said manifold chamber;

a plurality of circumferentially spaced second nozzles in said housing and opening outwardly from said manifold chamber in a direction away from said cavity, said second nozzles being operative to apply said lubricant to said surface of said overlying forming tool; and an inlet passage for conducting a supply of lubricant mixture to said manifold chamber, said inlet opening generally tangentially into said chamber so as to impart a generally circular flow to said lubricant within said manifold chamber such that said lubricant emanating from said annular nozzle opening will follow a helical flowpath into said cavity.

12. A spraying apparatus as set forth in claim 11 wherein said nozzle comprises an annular slot extending around the periphery of said central opening.

13. A spraying apparatus as set forth in claim 12 wherein said slot is angled generally axially inwardly into said cavity.

14. A spraying apparatus as set forth in claim 13 wherein said slot is defined by axially spaced concentric conical surfaces.

15. A spraying apparatus as set forth in claim 14 wherein one of said surfaces is defined by said housing and the other is defined by said insert.

16. A spraying apparatus as set forth in claim 11 wherein said second nozzles comprise a plurality of bores, each of said bores having an axis inclined generally radially inwardly and circumferentially whereby the flow of lubricant emanating therefrom will follow a generally helical conical spiral.

17. A spraying apparatus as set forth in claim 16 wherein said annular nozzle is angled generally axially inwardly into said cavity.

* * * * *

UNITED STATES PATENT AND TRADEMARK OFFICE
CERTIFICATE OF CORRECTION

PATENT NO. : 4,565,082

DATED : January 21, 1986

INVENTOR(S) : Allan B. Heath et al

It is certified that error appears in the above-identified patent and that said Letters Patent is hereby corrected as shown below:

On the Title Page:
the title "Spray Apparatus For Metal Forming Machines" should be
--Spray Apparatus For Metal Forming And Glassware Forming Machines--.

Column 3 line 62, "couterbore" should be --counterbore--.

Column 4, line 41, Claim 1, "surface" should be --surfaces--.

Column 5, line 19, Claim 6, "surface" should be --surfaces--.

Signed and Sealed this

Tenth Day of June 1986

[SEAL]

Attest:

DONALD J. QUIGG

Attesting Officer

Commissioner of Patents and Trademarks